(12) United States Patent
Wu et al.

(10) Patent No.: US 6,628,366 B2
(45) Date of Patent: Sep. 30, 2003

(54) METHOD FOR FORMING A MULTI-GAP LIQUID CRYSTAL DISPLAY

(75) Inventors: Ivan Wu, Taipei (TW); Dai-Liang Ting, Hsinchu (TW)

(73) Assignee: Unipac Optoelectronics Corp., Hsinchu (TW)

( * ) Notice: Subject to any disclaimer, the term of this patent is extended or adjusted under 35 U.S.C. 154(b) by 352 days.

(21) Appl. No.: 09/842,037

(22) Filed: Apr. 25, 2001

(65) Prior Publication Data

US 2002/0109817 A1 Aug. 15, 2002

(30) Foreign Application Priority Data

Dec. 13, 2000 (TW) .................................. 89126545 A (51) Int. Cl.[7] .............................................. G02F 1/133
(52) U.S. Cl. ......................... 349/187; 349/106; 438/30
(58) Field of Search ............................... 349/187, 106; 438/30

(56) References Cited

U.S. PATENT DOCUMENTS

| | | | | |
|---|---|---|---|---|
| 5,402,141 A | * | 3/1995 | Haim et al. ................... 345/88 |
| 5,499,126 A | * | 3/1996 | Abileah et al. ............. 349/106 |
| 6,037,084 A | * | 3/2000 | Ting et al. ...................... 430/7 |
| 6,181,401 B1 | * | 1/2001 | Penn ........................... 349/129 |
| 6,287,733 B1 | * | 9/2001 | Miyazaki et al. .............. 430/7 |

* cited by examiner

Primary Examiner—Robert H. Kim
Assistant Examiner—P. R. Akkapeddi
(74) Attorney, Agent, or Firm—J. C. Patents (57) ABSTRACT

The invention provides a method for forming a multi-gap liquid crystal display. The method includes providing a substrate. A first insulating layer is formed on the substrate. Several bus lines are formed on the first insulating layer. A second insulating layer is formed on the first insulating layer and the bus lines. The bus lines divides the substrate into a first color region, a second color region, and a third color region. A photoresist layer covers the second color region and the third color region, where the photoresist layer at the second color region is thinner than that at the third color region. A portion of the first insulating layer and the second insulating layer is etched to expose the substrate at the first color region. A portion of the photoresist layer at the second color region is removed, whereby the second insulating layer is exposed and the remaining photoresist layer still covers the third color region and the bus lines. The second insulating layer is etched to expose the first insulating at the second color region, using the remaining photoresist layer as a mask. Alternatively, the first step of etching can only remove a portion or the whole of the second insulating layer in the first color region, and then the second step of etching removes the first insulating layer to expose the substrate.

18 Claims, 7 Drawing Sheets

METHOD FOR FORMING A MULTI-GAP LIQUID CRYSTAL DISPLAY

CROSS-REFERENCE TO RELATED APPLICATION

This application claims the priority benefit of Taiwan application Serial No. 89126545, filed on Dec. 13, 2000.

BACKGROUND OF THE INVENTION

1. Field of Invention

The present invention relates to formation of liquid crystal display. More particularly, the present invention relates to a method for forming a multi-gap liquid crystal display.

2. Description of Related Art

Display is a very common device in our daily life. For example, a TV set or a computer system always need a display, whereby images can be shown on the screen, and present to the user. If the display is designed using technology of cathode-ray tube (CRT), it usually needs a large space, causing inconvenient. Especially, the notebook computer system cannot be equipped with the CRT display. Therefore, a planar display with image pixel design, such as a thin film transistor liquid crystal display (TFT LCD), has been successfully developed.

The liquid crystal display is designed with a mechanism of non-spontaneous emitting light. Liquid crystal is a material has state between crystal and liquid phase. When the liquid crystal cells are applied with external electric field, aligned direction of liquid crystal cells then changes due to the affection of the electric field. The direction of the liquid crystal then results in a change of polarization for the passing light. In associating with a polarizing plate, The liquid crystal can behave like an optical gate, and thereby the mechanism can be used to form a displaying device. However, the transmission rate may vary with different wavelengths and different viewing angles. This phenomena cause issues, such as color shift and dispersion. These issues are strongly necessary to be solved.

SUMMARY OF THE INVENTION

The invention provides a method for forming a multi-gap liquid crystal display. The method includes providing a substrate. A first insulating layer is formed on the substrate. Several bus lines are formed on the first insulating layer. A second insulating layer is formed on the first insulating layer and the bus lines. The bus lines divides the substrate into a first color region, a second color region, and a third color region. A photoresist layer covers the second color region and the third color region, where the thickness of the photoresist layer at the second color region is less than the thickness at the third color region. A portion of the first insulating layer and the second insulating layer is etched to expose the substrate at the first color region. A portion of the photoresist layer at the second color region is further removed, whereby the second insulating layer is exposed and a remaining portion of the photoresist layer still covers the third color region and the bus lines. The second insulating layer is etched to expose the first insulating at the second color region, using the remaining portion of the photoresist layer as an etching mask. Alternatively, in the foregoing first step of etching can only remove a portion or the whole of the second insulating layer in the first color region, and then the second step of etching removes the first insulating layer to expose the substrate. However, a portion of the first insulating layer can optionally remain without exposing the substrate at the first color region. The purpose of the etching is to have three different thickness, so as to respectively have different Δnd for the insulating layer.

In the foregoing, the photoresist layer with different thickness can be formed by technology of phase shift photomask, so that it has different thickness at the different color regions. The photoresist layer has two patterns and therefore one photolithographic process can be saved in the fabrication process. The fabrication cost and time can be effectively reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention particularly employs a technology of phase shift photomask to form a photoresist layer with different thickness. The photoresist layer is removed by two steps, so that two mask patterns can be obtained for performing etching process. As known in the art, the photoresist layer with pattern usually takes a lot of cost and time. In the invention, there is no need of additional photomask for formation of photoresist layer. Fabrication cost and time can be effectively reduced.

Figure 1A:
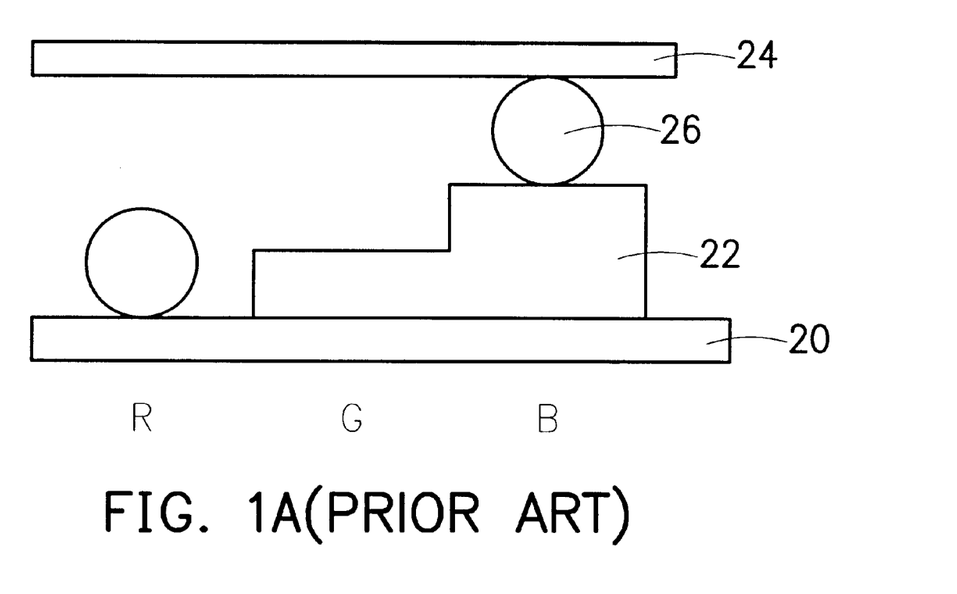
FIG. 1A is a cross-sectional view, schematically illustrating a multi-gap liquid crystal display.

Theoretically, if the light path Δnd of the three primary colors when traveling through the liquid crystal layer is set to be different, issues of color shift and color dispersion can be reduced. The structure of a multi-gap liquid crystal display is shown in FIG. 1A. The liquid crystal display includes an upper substrate 24 and a lower substrate 20. A liquid crystal can be filled between the upper substrate 24 and the lower substrate 20. In order to have different Δnd for the red (R) primary light, green (G) primary light and the blue (B) primary light, a multi-gap structure is formed on the substrate 20. Usually, the blue region has smaller Δnd. Then, space particles 26 are sprayed over the substrate 20. The particle spacer 26 on highest step serve the supporting force to hold the substrate 24, and obtain the desired Δnd.

Figure 1B:
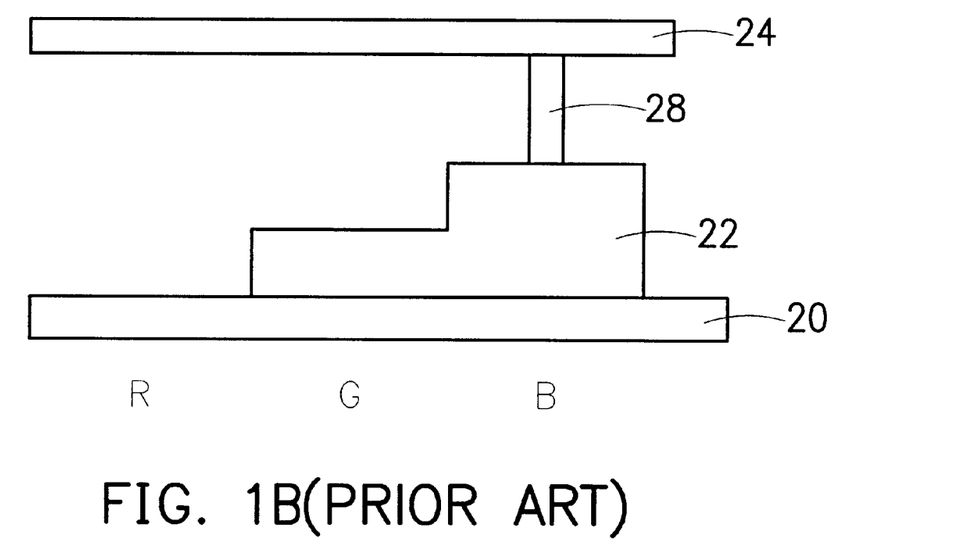
FIG. 1B is a cross-sectional view, schematically illustrating another multi-gap liquid crystal display.

Moreover, the manner by spacer particles can be replaced with a photo spacer. FIG. 1B is a cross-sectional view, schematically illustrating another multi-gap liquid crystal display. In FIG. 1B, a photo spacer 28 replace the particle spacer 26 in FIG. 1A. The liquid crystal display also includes other elements, but not directly related to the invention. No further description is provided.

In the foregoing, in order to fabricate the multi-gap substrate as shown in FIG. IA, the fabrication process for the single-gape design needs additional steps. The additional steps always causes more fabrication time and cost. The fabrication process is necessary to be simplified.

FIGS. 2A–2E are cross-sectional views, schematically illustrating fabrication processes for a multi-gap liquid crystal display, according to one preferred embodiment of this invention.

Figure 2A:
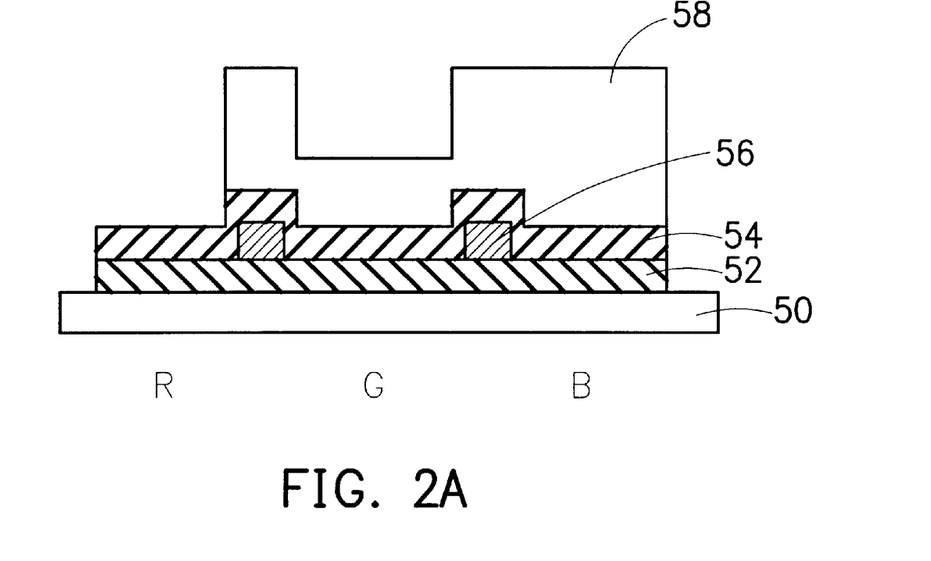
FIGS. 2A–2E are cross-sectional views, schematically illustrating fabrication processes for a multi-gap liquid crystal display, according to one preferred embodiment of this invention.

In FIG. 2A, one image pixel as a unit for description includes a substrate 50. An insulating layer 52 is formed on the substrate 50. The insulating layer 52 can include, for example, silicon nitride. There are several bus lines 56, such as data lines, formed on the insulating layer 52. The bus lines 56 divide the substrate 50 into three color regions, such as a red region R, a green region G, and a blue region B. An insulating layer 54 is formed on the insulating layer 52 and the bus line 56. A photoresist layer 58 is formed over the green region R and the blue region B but the red region R is exposed. The thickness of the photoresist layer 58 at the green region G is less than the thickness at the blue region B. This step structure of the photoresist layer can be formed by, for example, technology of phase-shift photomask, or preferably by half-tone photomask.

Figure 2B:
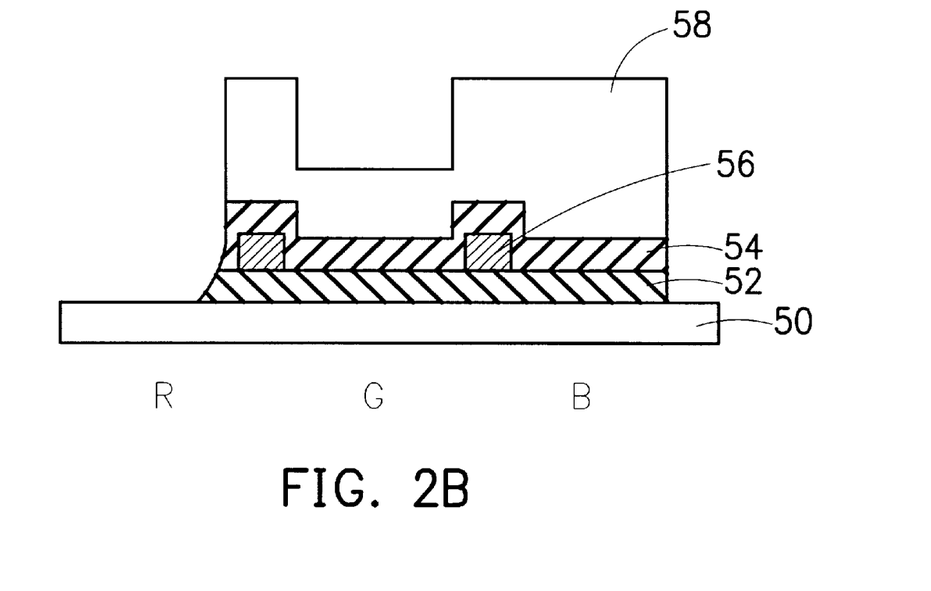

In FIG. 2B, the insulating layers 52 and 54 are etched with using the photoresist layer 58 as a mask. As a result, the substrate 50 at the red region R is exposed.

Figure 2C:
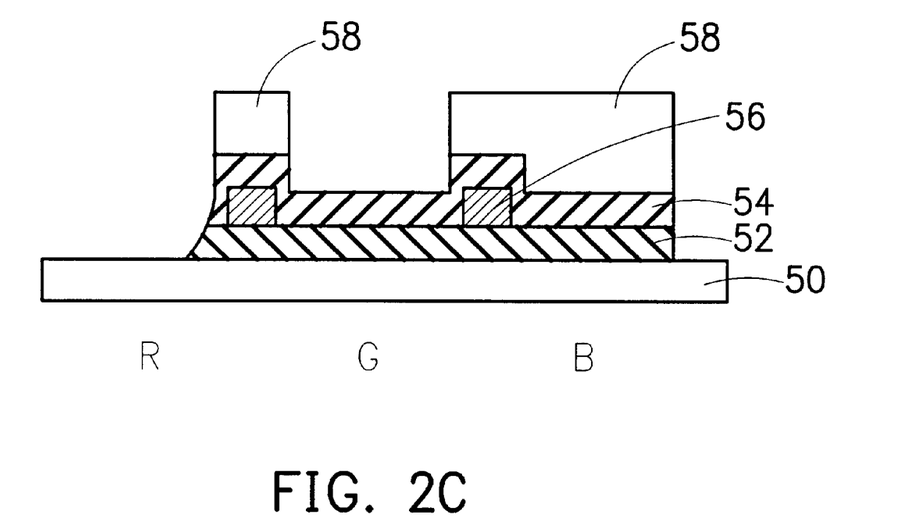
Figure 2D:
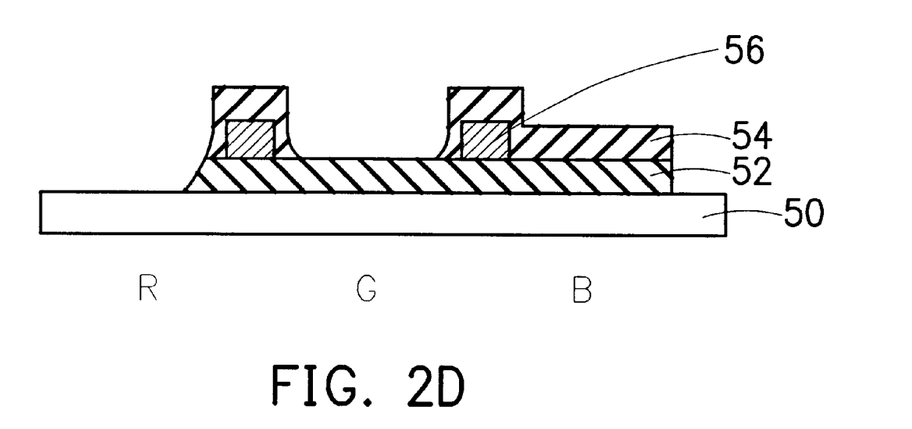
Figure 2E:
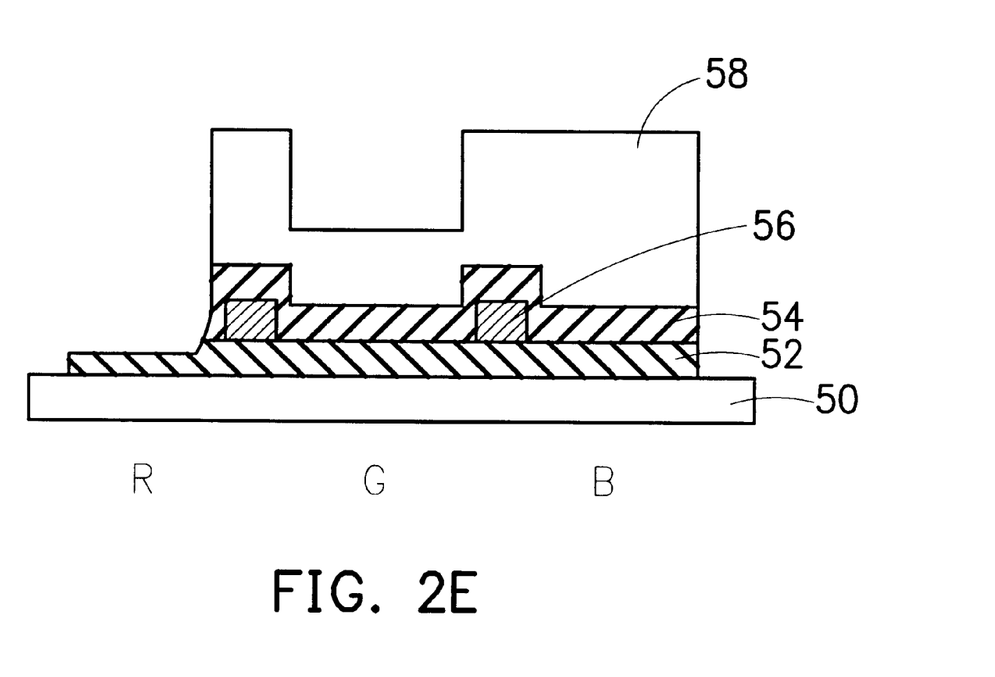

This etching step can also be performed as shown in FIG. 2E, where the first etching step removes the whole or portion of the second insulating layer 54. Then the second etching step etches the insulating layer to expose the substrate 50 at the red region R. However, the insulating layer 52 can still remain a portion at the red region without being fully exposed. The purpose of the etching process is for forming an insulating layer with different thickness with respect to three color regions, and obtaining different Δnd. In general, the structure, as shown in FIG. 2E, has the insulating layer composed of the first insulating layer 52 and the second insulating layer 54. The insulating layer can be only removed a portion at the first color region without exposing the substrate thereon. However, the insulating layer can also be removed to expose the substrate 50 at the first color region, as shown in FIG. 2D.

The etching process include, for example, a dry etching. After etching, the sidewall of the insulating layer has a slant angle from the substrate 50, extending externally. The angle is about 70 degrees or less. This slant angle is helpful for the subsequent deposition.

Now referring to FIG. 2C, the photoresist layer 58 at the green region is removed by, for example, ashing process, and thereby the insulating layer 54 is exposed. Since the thickness of the photoresist layer 58 at the green region G is less then that at the blue region B, it still has a remaining portion of the photoresist layer 58 at the blue region B and the bus lines 56. As a result, the substrate 58 at the green region is exposed.

In FIG. 2D, the remaining portion of the photoresist layer 58 is used as the etching mask in the etching process for removing a portion of the insulating layer 54. The insulation layer 52 at the green region is exposed. The photoresist layer 58 is then removed. In this manner, for the insulating layer composed of the insulating layers 52 and 54 on the substrate 50, it has three different height with respect to three color regions. The substrate 50 is not absolutely required to be exposed. In general, the color region has no specific sequence order, but they are preferably arranged with red, green, and blue. Thereby, the blue region has smaller Δnd. It also allows a portion of the insulating layer remaining at the red region of the substrate 50, at which the substrate is not exposed. According to the invention, it has been sufficient that the insulating layer at the red region R, the green region G, and the blue region B have different height to achieve different Δnd.

Figure 3:
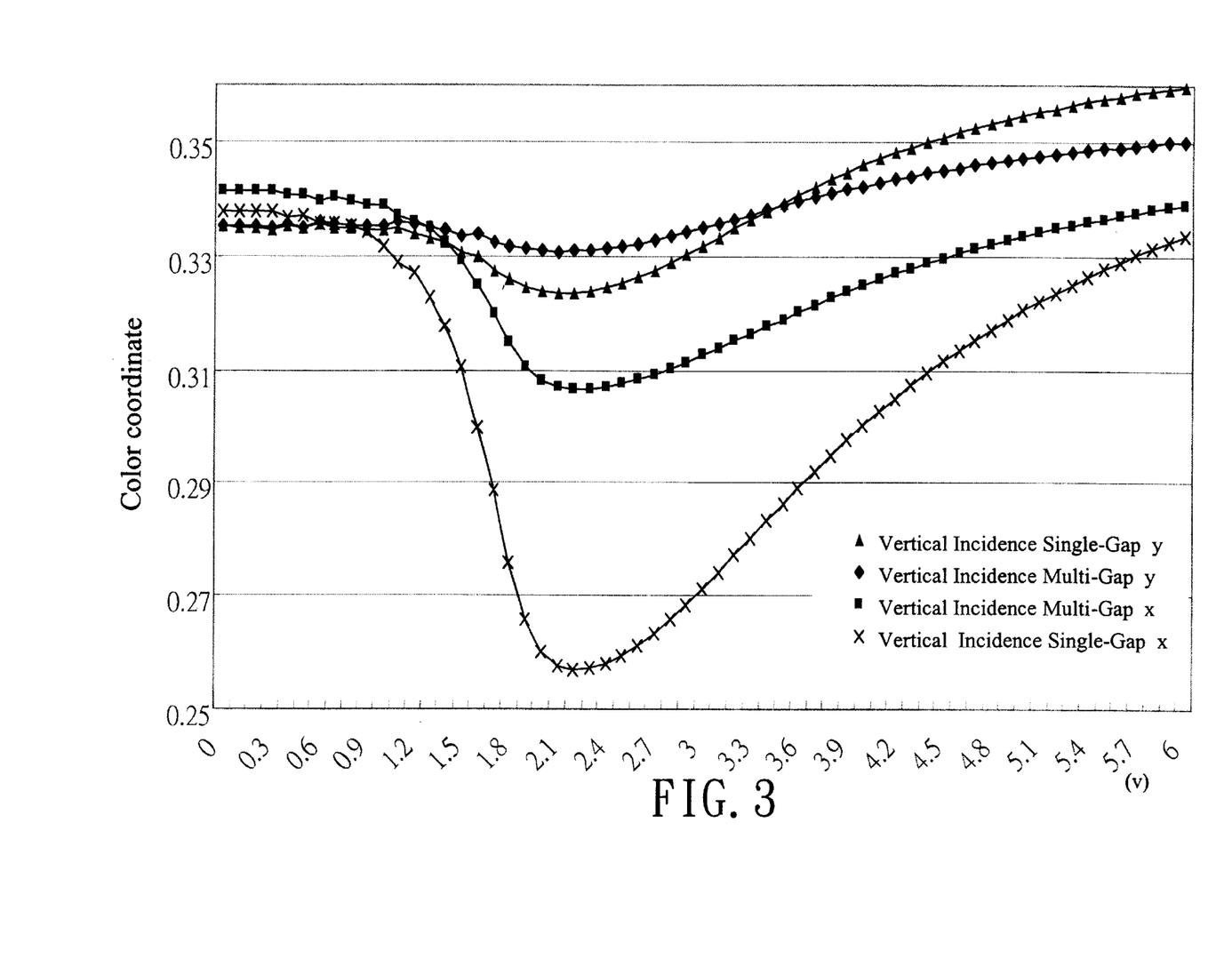
FIGS. 3–5 are drawings of color coordinates (Y-axis) versus applied voltage (X-axis), illustrating simulation results for comparison between the single-gap design and the multi-gap design for liquid crystal display, according to one preferred embodiment of this invention.
Figure 4:
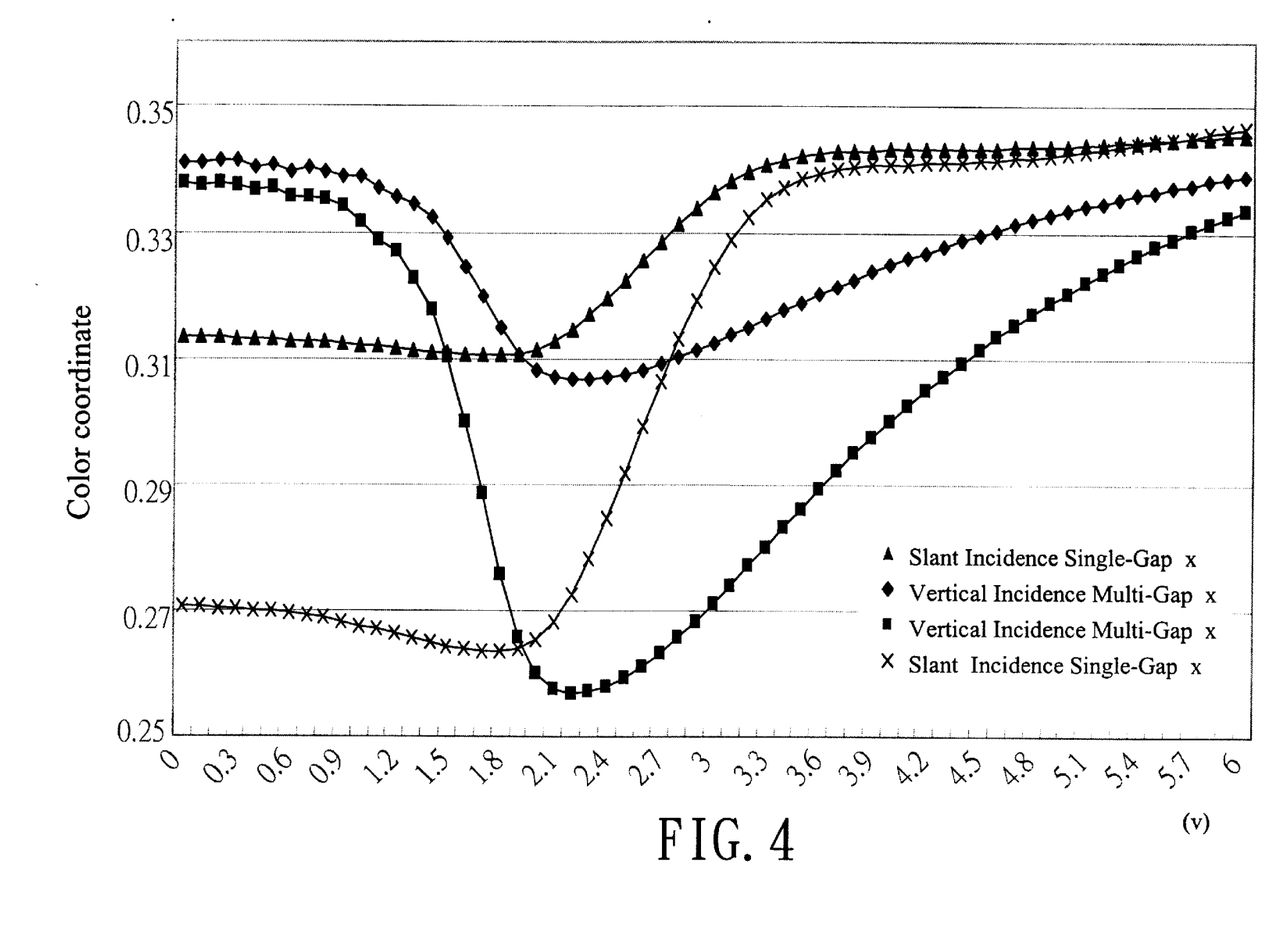
Figure 5:
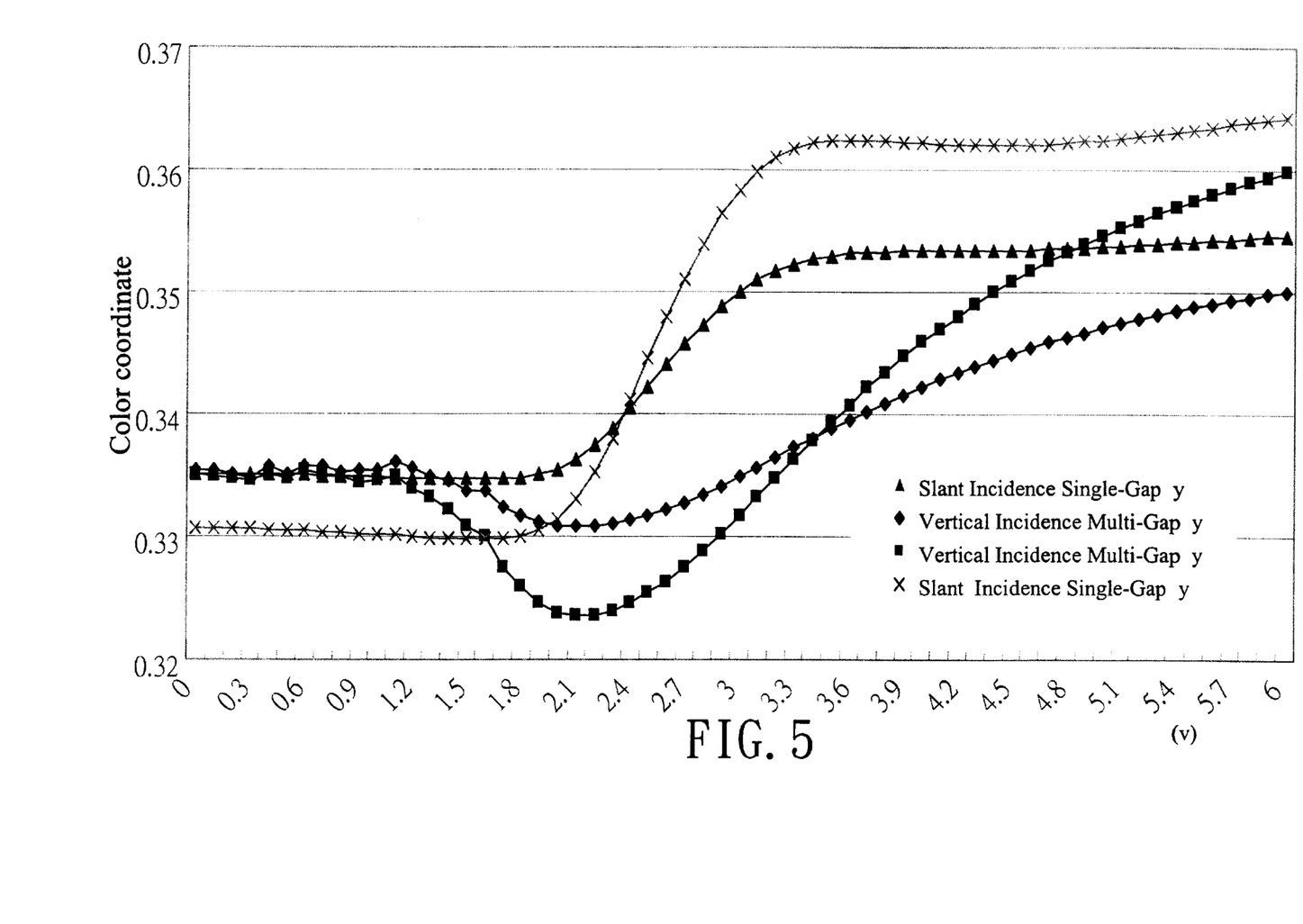

The further investigation of Δnd on reducing the color shift and dispersion is proceeded by simulation. The simulated results are shown in FIGS. 3–5. The simulation conditions are listed in table 1.

TABLE 1

| Single-Gap | Multi-gap Red | Multi-gap Green | Multi-gap Blue |
| --- | --- | --- | --- |
| 3.9 microns | 4.22 microns | 3.9 microns | 3.58 microns |

The quantities in Table 1 is the distance between the upper substrate 24 and the insulating layer 22 on the lower substrate 20 as shown in FIG. 1A. In other words, the insulating layer 52 and 54 in FIG. 2D is 0.32 microns. Moreover, the CIE color coordinate x and y is usually used for describing the color condition. At the normal white, both the quantities of the x and y are 0.33. Table 2 is the comparison results between the bright state and dark state, also between view in right angle and view in slant angle.

TABLE 2

| Δx | Bright/Dark | Front view/slant view | Δy | Bright/Dark | Front view/slant view |
| --- | --- | --- | --- | --- | --- |
| Single-gap | 0.063 | 0.032 | Single-gap | 0.022 | 0.007 |
| Multi-gap | 0.026 | 0.016 | Multi-gap | 0.010 | 0.007 |

Results in Table 2 have shown that the quantity of color shift for multi-gap design has significantly reduced, comparing with the single-gap design. The slant view is a view angle of 45 degrees counted from the horizontal level.

Moreover, with respect to the variation of operation voltage (horizontal axis), the multi-gap design has also smaller color shift than the single-gap design. In FIG. 3, the comparison between front view and slant view at the right view is shown. The line with cross marks is the variation of the x coordinate under right view with single-gap design, the line with squared marks is the variation of the x coordinate under right view with multi-gap design. The line with diamond marks is the variation of the y coordinate under right view with multi-gap design, the line with triangle marks is the variation of the x coordinate under right view with single-gap design.

In FIG. 4, the comparison on the x coordinate between right view and slant view. The line with squared marks is the variation of the x coordinate under right view with single-gap design, the line with cross marks is the variation of the x coordinate under slant view with single-gap design. The line with diamond marks is the variation of the x coordinate under right view with multi-gap design, the line with triangle marks is the variation of the x coordinate under slant view with multi-gap design.

In FIG. 5, the comparison on the y coordinate between right view and slant view. The line with squared marks is the variation of the y coordinate under right view with single-gap design, the line with cross marks is the variation of the y coordinate under slant view with single-gap design. The line with diamond marks is the variation of the y coordinate under right view with multi-gap design, the line with triangle marks is the variation of the y coordinate under slant view with multi-gap design.

From the forgoing simulation results, the color shift in the multi-gap design is less than the color shift in the single-gap design. The invention takes the multi-gap design principle without too much modification on the current fabrication processes. There is no need of additional photoresist in the fabrication process. The fabrication cost and time can be effectively reduced.

Further still, while the insulating layer is etched, the sidewall of the insulating layer has a slant angle, which is helpful for the step coverage in the subsequent electrode deposition process.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for forming a multi-gap liquid crystal display, the method comprising:

providing a substrate, the substrate having a first insulating layer and a plurality of bus lines formed on the first insulating layer, and the bus lines dividing the substrate into a first color region, a second color region, and a third color region;

forming a second insulating layer on the first insulating layer and the bus lines;

forming a photoresist layer, covering the second color region and the third color region, wherein a thickness of the photoresist layer at the second color region is smaller than a thickness of the photoresist layer at the third color region;

performing a first etching process, using the photoresist layer as a mask, to etch the first insulating layer and the second insulating layer, whereby the substrate at the first color region is exposed;

removing a portion of the photoresist layer at the second color region, wherein the second insulating layer is exposed, and a remaining portion of the photoresist layer still covers the third color region and the bus lines;

performing a second etching process, using the remaining portion of the photoresist layer, to etch the second insulating layer, wherein the first insulating layer is exposed; and removing the remaining portion of the photoresist layer.

2. The method of claim 1, wherein the step of forming the photoresist layer covering the second color region and the third color region comprises one selected from the group consisting of process by phase-shifting mask and process by half-tone mask process.

3. The method of claim 1, wherein the step of removing the portion of the photoresist layer at the second color region comprises an ashing process.

4. The method of claim 1, wherein the first color region, the second color region, and the third color region are respectively a red region, a green region, and a blue region.

5. The method of claim 1, wherein in the step of performing the first etching process, a sidewall of the first insulating layer and the second insulating layer has an slant structure extending externally.

6. The method of claim 5, wherein the slant structure comprises a slant angle is not greater than 70 degrees.

7. A method for forming a multi-gap liquid crystal display, the method comprising:

providing a substrate, the substrate having a first insulating layer and a plurality of bus lines formed on the first insulating layer, and the bus lines dividing the substrate into a first color region, a second color region, and a third color region;

forming a second insulating layer on the first insulating layer and the bus lines;

forming a photoresist layer, covering the second color region and the third color region, wherein a thickness of the photoresist layer at the second color region is smaller than a thickness of the photoresist layer at the third color region;

performing a first etching process, using the photoresist layer as a mask, to etch at least a portion of the second insulating layer;

removing a portion of the photoresist layer at the second color region, wherein the second insulating layer is exposed, and a remaining portion of the photoresist layer still covers the third color region and the bus lines;

performing a second etching process, using the remaining portion of the photoresist layer, to etch at least portions of the first insulating layer and the second insulating layer, whereby the second color region and the third color region have height of the insulating layers; and removing the remaining portion of the photoresist layer.

8. The method of claim 7, wherein the step of forming the photoresist layer covering the second color region and the third color region comprises one selected from the group consisting of process by phase-shifting mask and process by half-tone mask process.

9. The method of claim 7, wherein the step of removing the portion of the photoresist layer at the second color region comprises an ashing process.

10. The method of claim 7, wherein the first color region, the second color region, and the third color region are respectively a red region, a green region, and a blue region.

11. The method of claim 7, wherein in the step of performing the first etching process, a sidewall of the first insulating layer and the second insulating layer has an slant structure extending externally.

12. The method of claim 11, wherein the slant structure comprises a slant angle is not greater than 70 degrees.

13. A method for forming a multi-gap liquid crystal display, the method comprising:

providing a substrate, the substrate having a first insulating layer and a plurality of bus lines formed on the first insulating layer, and the bus lines dividing the substrate into a first color region, a second color region, and a third color region;

forming a second insulating layer on the first insulating layer and the bus lines, wherein the first insulating layer and the second insulating layer serve together as a third insulating layer;

forming a photoresist layer, covering the second color region and the third color region, wherein a thickness of the photoresist layer at the second color region is smaller than a thickness of the photoresist layer at the third color region;

performing a first etching process, using the photoresist layer as a mask, to etch a portion of the third insulating layer;

removing a portion of the photoresist layer at the second color region, wherein the second insulating layer is exposed, and a remaining portion of the photoresist layer still covers the third color region and the bus lines;

performing a second etching process, using the remaining portion of the photoresist layer, to etch the third insulating layer, whereby a first thickness of the third insulating layer at the first color region is smaller than a second thickness of the third insulating layer at the second color region, wherein the substrate at the first color region can be optionally exposed; and removing the remaining portion of the photoresist layer.

14. The method of claim 13, wherein the step of forming the photoresist layer covering the second color region and the third color region comprises one selected from the group consisting of process by phase-shifting mask and process by half-tone mask process.

15. The method of claim 13, wherein the step of removing the portion of the photoresist layer at the second color region comprises an ashing process.

16. The method of claim 13, wherein the first color region, the second color region, and the third color region are respectively a red region, a green region, and a blue region.

17. The method of claim 13, wherein in the step of performing the first etching process, a sidewall of the first insulating layer and the second insulating layer has an slant structure extending externally.

18. The method of claim 17, wherein the slant structure comprises a slant angle is not greater than 70 degrees.

* * * * *